United States Patent [19]
Bouretz et al.

[11] Patent Number: 5,540,001
[45] Date of Patent: Jul. 30, 1996

[54] DEVICE FOR REMOVING DUST FROM NUCLEAR FUEL PELLETS

[75] Inventors: Jean-Marie Bouretz, Manosque; Hervé Bernard, Aix-En-Provence, both of France

[73] Assignee: Commissariat a l'Energie Atomique, Paris, France

[21] Appl. No.: 161,272

[22] Filed: Dec. 3, 1993

[30] Foreign Application Priority Data

Dec. 14, 1992 [FR] France ................................ 92 15026

[51] Int. Cl.⁶ .......................................... F26B 3/10
[52] U.S. Cl. ................................ 34/591; 15/348
[58] Field of Search ........................... 34/576, 579, 582, 34/591; 15/347, 348

[56] References Cited

U.S. PATENT DOCUMENTS 4,070,240  1/1978  Kugler et al. .

FOREIGN PATENT DOCUMENTS 0183979  6/1986  European Pat. Off. .
2174631  10/1973 France .
2577065  8/1986  France .
144472   10/1980 Germany .
300720   7/1992  Germany .

*Primary Examiner*—Henry A. Bennett
*Attorney, Agent, or Firm*—Oblon, Spivak, McClelland, Maier, & Neustadt, P.C.

[57] ABSTRACT

The invention concerns a device for removing dust from nuclear fuel pellets.

The object of the invention is to embody a device able to simply and effectively remove dust from pellets coated with dust, including non-electrically charged dust.

This aim is obtained by using a device including a dedusting tube (1) inside which said pellets (35) circulate, said tube (1) being provided at its inlet extremity (2) with a gas injection orifice, an opening for introducing the pellets to be dedusted and means to create a laminar flow of dedusting gas around the pellets circulating in said tube, said tube (1) being further provided at its outlet extremity (4) with a gas and dust suction opening and an opening for recovering the dedusted pellets (35).

12 Claims, 1 Drawing Sheet

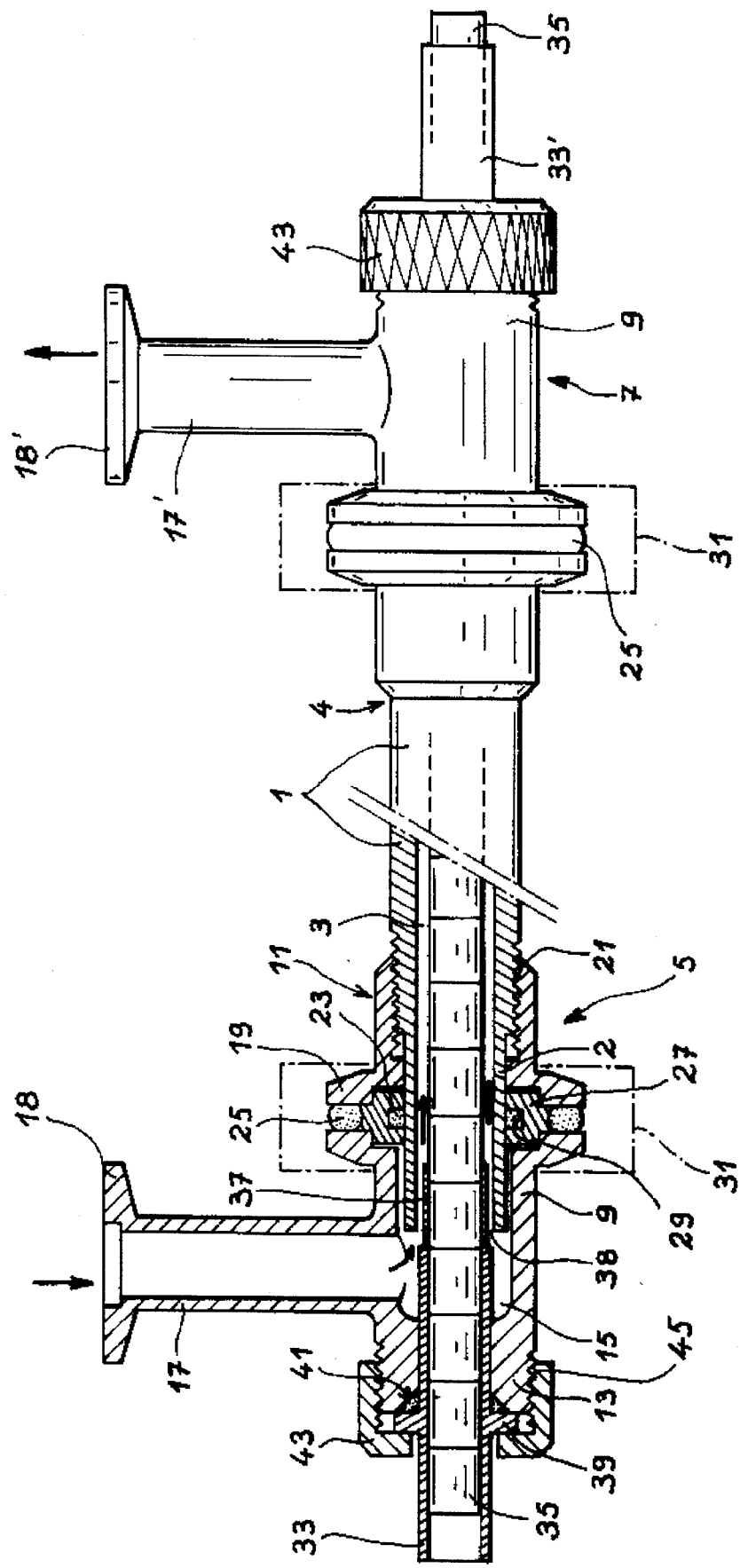

DEVICE FOR REMOVING DUST FROM NUCLEAR FUEL PELLETS

FIELD OF THE INVENTION

The present invention concerns a device for removing dust from nuclear fuel pellets, said device being able without any mechanical rubbing to remove nuclear fuel particles or dust possibly adhering to the outer surface of these pellets.

BACKGROUND OF THE INVENTION

This device is intended to be used in a working station where ceramic fuel pellets are sorted according to appearance criteria, such as the presence of superficial defects or local material deficiencies and where precise geometrical measurements are carried out, such as the measurement of the diameter or height of said fuel pellets. This metrology and this appearance sorting are generally automated and are then embodied by methods using lasers. Now, the presence of dust on these fuel pellets generates aberrant or deviant defects which ought to be eliminated. Accordingly, it is desirable to dedust these pellets.

In addition, if special precautions are not taken when introducing the fuel pellets into their casing tube, the dust adhering to the outer surface of the pellets risks entering and being suspended in the ambient atmosphere and contaminating the outside of the tube or the immediate vicinity of the feed orifice.

The prior art discloses a number of dedusting devices.

According to the document FR-A-2 379 886, a sealed confinement system is described for a nuclear reactor and able to assemble nuclear fuel elements and in particular fill the latter with fuel pellets. This system includes a plurality of stations for assembling fuel elements, that is in particular a device for loading the pellets inside fuel elements, a station for inserting plugs and a device for welding these plugs. In addition, this device includes transport means connecting together the various assembling stations. Finally, these assembling stations are disposed along a sealed closing body and opening inside the latter. Furthermore, the extremities of the fuel elements also open into this sealed closing body, the latter including an electrostatic sealing device.

According to this invention, this electrostatic sealing device includes an electrostatic field dedusting device. This dedusting device includes a chamber inside which the fuel element circulates, said chamber being provided with two precipitation cells placed on both sides of the path of the fuel element. Each of these precipitation cells is a rectangular box including a set of metallic bars constituting a protective shield, an electrode being placed behind said shield. Continuous high voltage is applied to this electrode so as to create a corona effect discharge. All the material particles carried into the air circulating around the fuel element are then electrostatically charged and attracted towards the precipitation cells. Owing to this, they are removed from the main air current.

However, this device does have several drawbacks. In particular, it requires that high voltage is present in the confinement chambers, which proves to be harmful as there is a risk of creating electric arcs.

Furthermore, it is able to solely remove fine electrically charged particles.

In addition, there also exists a nuclear fuel pellet dedusting device commercialized by the BELGONUCLEAIRE company using first of all a system of forced air jet directed perpendicular to the cylindrical peripheral wall of the pellet, and secondly a suction system applied to a train of pellets moving inside a helical spring situated in a chamber kept in a partial vacuum.

This device is unsatisfactory and is unable to obtain correct dedusting. In fact, it tends to clad a certain amount of dust against the surface of the pellet rather then remove it.

SUMMARY OF THE INVENTION

The object of the invention is to resolve said drawbacks and implement an effective dedusting device.

To this effect, the invention concerns a device for removing dust from nuclear fuel pellets and including a dedusting tube inside which said pellets circulate.

According to the characteristics of the invention, this dedusting tube is provided at its incoming extremity with a gas injection orifice, an opening for introducing the pellets to be dedusted, and means to create a laminar dedusting gas flow with a speed of at least 25 m/s around the pellets circulating in said tube, this gas flow being parallel and having the same direction as the direction of movement of said pellets, said dedusting tube being further provided at its outlet extremity with an orifice for sucking up the gas and dust and an opening for recovering the dedusted pellets.

Owing to the fact that the flow of air is parallel to the direction of movement of the pellets, the dust is no longer clad on said pellets and are easily eliminated.

BRIEF DESCRIPTION OF THE DRAWINGS

The invention shall be more readily understood from a reading of the following description of one embodiment of the invention given by way of non-restrictive example, this description being given with reference to the accompanying FIG. 1 which shows a partial cutaway view of the dedusting device of the invention.

DETAILED DESCRIPTION OF THE PREFERRED EMBODIMENT

This dedusting device includes a dedusting tube 1 inside which the nuclear fuel pellets circulate. This tube 1 is machined internally so as to have a set of helical grooves 3 extending over its entire length. This dedusting tube 1 preferably includes at least four grooves and preferably more, namely six. The internal diameter of this dedusting tube 1 is slightly larger than that of the cylindrical fuel pellets circulating inside it.

This dedusting tube 1 is provided at its inlet extremity 2 and outlet extremity 4 respectively with an inlet joining piece 5 and an outlet joining piece 7. FIG. 1 shows solely a cutaway view of the inlet joining piece 5, but the outlet joining piece 7 has an identical structure with slightly different functions. The elements common to the two joining pieces and providing the same functions bear the same references. On the other hand, the elements of the outlet joining piece 7 providing those functions differing from those of the inlet joining piece 5 bear identical references but increased by a "prime mark" sign.

The inlet joining piece 5 is mainly composed of a cylindrical sleeve 9 with one of its extremities 11 being fixed to the inlet extremity 2 of the tube 1, the other extremity 13 enabling the pellets to be introduced.

This cylindrical sleeve 9 internally defines a gas injection chamber 15. In addition, this sleeve 9 includes a gas injection pipe 17 opening into the injection chamber 15 approximately perpendicular to the axis of the dedusting tube 1. This injection pipe may be welded to or cast intergal with the sleeve 9, as shown on FIG. 1. To this effect, the tube 1 and the inlet 5 and outlet 7 joining pieces are made of stainless steel. The gas injection pipe 17 has at its free extremity a fixing flange 18. Similarly, the cylindrical sleeve 9 of the outlet joining piece 7 includes a gas collection chamber 15'. In addition, the pipe 17' provided in the outlet joining piece 7 is able to suck up the gas and dust situated on and around the surface of the pellets.

The cylindrical sleeve 9 is rendered integral with the dedusting tube 1 by means of a flange connector 19 screwed onto an annular threaded zone 21 of the dedusting tube 1 provided to this effect. Imperviousness between the cylindrical sleeve 9 and the flange connector 19 is ensured by one first gasket 23 and by a second gasket 25. The first gasket 23 is maintained against the outer face of the dedusting tube 1 by a holding element 27 having a U-shaped throat 29 for receiving said gasket 23. In addition, the cylindrical sleeve 9 is assembled with the flange connector 19 by means of an annular connector 31, for example a "pneurope" type connector.

The dedusting device also includes a tube 33 for introducing the pellets 35. This tube 33 penetrates inside the cylindrical sleeve 9 coaxially to the latter and, to this effect, has one introduction extremity 37 whose thickness is smaller than the thickness of the rest of the tube 33. This introduction extremity 37 penetrates over a short length at the inlet of the dedusting tube 1 so as to define with the latter an annular passage 38 for introducing the gas. In addition, this pellet introduction tube 33 has a ring 39 forming a projection approximately at the middle of its thickest portion and on the outer surface of the latter. This projection 39 forms a stop and the pellet introduction tube 33 is driven into the cylindrical sleeve 9 until the projection 39 abuts against the free extremity of said cylindrical sleeve 9. So as to ensure imperviousness between these two elements, an annular gasket 41 is provided at the level of this joining surface. The fixing of the pellet introduction tube 33 inside the cylindrical sleeve 9 is ensured by an extremity ring 43 screwed onto a threaded annular zone 45 provided to this effect on the extremity 13 of the cylindrical sleeve 9. Similarly, the tube 33' provided in the outlet joining piece 7 allows for recovery of the pellets after the latter have been dedusted and has an annular gas suction passage 38'.

It shall be observed that the pellet introduction tube 33 and the dedusting tube 1 have an internal diameter approximately equal to the internal diameter of the casings into which the fuel pellets are introduced subsequent to the dedusting stage.

The air suction pipe 17' is connected by means of the flange 18' to a dust recovery device including a cyclone dust catcher and an absolute filter. As these devices are extremely conventional and familiar with experts in this field, they shall not be described further and are not shown on FIG. 1.

The cylindrical nuclear fuel pellets 35 are introduced into the dedusting device with the aid of a pushing device or any other conventional device so as to circulate as a column inside the dedusting tube 1. A guiding V is preferably placed at the inlet of the dedusting device, said V making it possible to more easily introduce the pellets 35 inside the tube 11. A similar device may be installed at the outlet at the level of the tube 33' for recovering the pellets 35 so as to guide the dedusted pellets towards another portion of the device, for example a encasing device. The guiding V and the pushing device are not shown on FIG. 1. Finally, the entire device may be mounted on a frame (also not shown).

The gas injection chamber 15 is cylindrical so as to ensure a balance of distribution of the circulating gas originating from the injection pipe 17 in the direction of six helical grooves 3. The gas penetrates under pressure inside the dedusting tube 1 by passing through the annular orifice 38. It is then carried inside the helical grooves 3. This has the effect of creating a laminar flow of gas circulating at extremely high speed inside the dedusting tube 1. This speed needs to be at least 25 m/s and preferably between 25 and 35 m/s. This flow of gas is parallel and has the same direction as the direction of movement of the fuel pellets 35. It is this gas flow which loosens the dust or particles present on the periphery of the fuel pellets 35. This device guarantees the elimination of dust of particles whose size is larger than 2 μm. Similarly, the outlet joining piece 7 has an annular gas suction passage 38'.

So as to increase the effectiveness of this dedusting device, several of the latter may be disposed in series. It is also possible to have carried out several successive passages with the fuel pellets inside this dedusting device.

Finally, although the invention has been described as being applicable more particularly to the industrial field of nuclear fuel pellets and nuclear ceramics, it may also be used to dedust pellets made of other materials and may be used in non-nuclear industries.

What is claimed is:

1. Nuclear fuel pellet dedusting device including a dedusting tube inside which said pellets circulate, wherein this tube is provided at its inlet extremity with a gas injection orifice, a pellet introduction opening, and means for creating a laminar dedusting flow of gas with a speed of at least 25 m/s around the pellets circulating in said tube, and wherein said tube is provided at its outlet extremity with a gas and dust suction orifice and an opening for recovering the dedusted pellets, this gas flow being parallel and progressing along the same direction as the direction of movement of said pellets along an entire length of said dedusting tube extending from said gas injection orifice to said gas and dust suction orifice.

2. Dedusting device according to claim 1, wherein it includes an inlet joining piece constituted by a cylindrical sleeve with one of its extremities being fixed to the inlet extremity of the dedusting tube and the other defining the pellet introduction opening, this cylindrical sleeve internally having a gas injection chamber and including a gas injection pipe opening into the gas injection chamber approximately perpendicular to the axis of the dedusting tube.

3. Dedusting device according to claim 1, wherein it includes an outlet joining piece constituted by a cylindrical sleeve with one of its extremities being fixed to the outlet extremity of the dedusting tube and the other defining the opening for recovering the pellets, this cylindrical sleeve internally having a gas collection chamber and including a gas suction pipe opening into said gas collection chamber approximately perpendicular to the axis of the dedusting tube.

4. Dedusting device according to claim 2, wherein the inlet joining piece is provided with a pellet introduction tube penetrating partially into the sleeve and coaxially to the latter so as to traverse the gas injection chamber and wherein its introduction extremity penetrates at the inlet of the dedusting tube, the outer diameter of the introduction extremity of the pellet introduction tube being smaller than the internal diameter of the dedusting tube so as to define with the latter an annular passage for introducing the gas.

5. Dedusting device according to claim 3, wherein the outlet joining piece is provided with a pellet recovery tube penetrating partially into the sleeve and coaxially to the latter so as to traverse the gas collection chamber and wherein its introduction extremity penetrates into the outlet of the dedusting tube, the outer diameter of the introduction extremity of the pellet recovery tube being smaller than the internal diameter of the dedusting tube so as to define with the latter an annular passage for sucking up the gas.

6. Dedusting device according to any one of the preceding claims, wherein the dedusting tube is internally provided with at least four helical grooves extending over its entire length.

7. Dedusting device according to claim 4, wherein the gas injection chamber, the annular passage and a plurality of helical grooves form means able to create the laminar gas flow.

8. Dedusting device according to claim 1, wherein the speed of the laminar gas flow is between 25 and 35 m/s.

9. Dedusting device according to claim 2 or 3, wherein the inlet and outlet joining pieces are secured to the dedusting tube by a flange connector and an annular connector.

10. Dedusting device of claim 1, wherein a gas injection chamber, an annular passage, and a plurality of helical grooves form means able to create the laminar gas flow.

11. Dedusting device of claim 2, wherein the gas injection chamber, an annular passage, and a plurality of helical grooves form means able to create the laminar gas flow.

12. Dedusting device according to claim 6, wherein a gas injection chamber, an annular passage and the helical grooves form means able to create the laminar gas flow.

* * * * *